(12) United States Patent
Maes

(10) Patent No.: US 8,234,702 B2
(45) Date of Patent: Jul. 31, 2012

(54) CROSS NETWORK LAYER CORRELATION-BASED FIREWALLS

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 860 days.

(21) Appl. No.: 11/512,585

(22) Filed: Aug. 29, 2006

(65) Prior Publication Data
US 2008/0072307 A1 Mar. 20, 2008

(51) Int. Cl.
*H04L 29/06* (2006.01)
(52) U.S. Cl. ........................................... 726/13
(58) Field of Classification Search ............... 726/11–15
See application file for complete search history.

(56) References Cited

U.S. PATENT DOCUMENTS

| | | | |
|---|---|---|---|
| 6,202,156 B1 * | 3/2001 | Kalajan | 726/11 |
| 2001/0056550 A1 * | 12/2001 | Lee | 713/201 |
| 2002/0087879 A1 * | 7/2002 | Mantena et al. | 713/201 |
| 2002/0095599 A1 * | 7/2002 | Hong et al. | 713/201 |
| 2004/0034793 A1 * | 2/2004 | Yuan | 713/200 |
| 2004/0255156 A1 * | 12/2004 | Chan et al. | 713/201 |
| 2005/0251854 A1 * | 11/2005 | Shay | 726/2 |
| 2005/0265327 A1 * | 12/2005 | Buch et al. | 370/389 |
| 2006/0155865 A1 * | 7/2006 | Brandt et al. | 709/230 |

* cited by examiner

*Primary Examiner* — Gilberto Barron, Jr.
*Assistant Examiner* — David Le
(74) *Attorney, Agent, or Firm* — Kilpatrick Townsend & Stockton LLP

(57) ABSTRACT

Lower layer traffic such as RTP streams or UDP packets that typically are not allowed through a firewall are permitted through the firewall by correlating the traffic with higher level communications already established, or messages exchanged, at a higher level layer such as for SIP sessions. Communication information and policies can be made available to the firewall, such that the firewall can allow through any packets for an active communication between authorized addresses through an authorized port. Such an approach can allow data such as streamed data and VoIP data to be passed through a firewall without weakening firewall policies.

24 Claims, 7 Drawing Sheets

CROSS NETWORK LAYER CORRELATION-BASED FIREWALLS

BACKGROUND OF THE INVENTION

As more information and types of information are becoming available on various connected computer networks, it is becoming increasingly important to ensure the security of data on these networks. One of the most common sources of security for such networks is a series of firewalls. Each firewall is a piece of hardware and/or software that is configured to allow or prevent communications arriving at the firewall. The choice to allow or deny a communication can be defined by at least one security policy for that firewall.

Network layer firewalls are protocol-based, and typically are utilized at a relatively low level of the relevant protocol stack, such as a TCP/IP protocol stack. Such a firewall generally acts as a packet filter, denying packets from passing through the firewall unless those packets meet the security rules defined in the security policy. Firewalls also can inspect all packets for proper content, in order to prevent viruses, spyware, or other undesirable content from passing through the firewall.

The need to inspect each packet can make it difficult for certain protocols to cross the firewall. For example, the User Datagram Protocol (UDP) is known to present challenges related to the inspection of the UDP packets. As a result, UDP signaling and data transported over UDP, such as Real-time Transport Protocol (RTP) data containing audio and/or video information such as voice or multimedia packets, cannot cross most firewalls. This severely limits the ability to deploy Voice over IP (VoIP), Web conferencing, and other streaming and/or multimedia applications across firewalls, whether between Internet and corporate intranet locations, between individual networks, or across companies, for example.

Certain existing systems attempt to solve this problem by creating a hole in the firewall using components of the firewall that are operable to open and maintain a communication channel through which the packets of a stream can be sent. In one example, a particular server that sends packets of information creates a hole at a particular port that can be used for sending the packet. In another example, a timeout can be used to allow a packet to pass through an open pinhole in the firewall. These approaches do not, however, allow for inspection or verification of the packets. The firewall can be configured to inspect each packet, even for UDP or other such packets, and make a clever decision based on a priori rules as to whether to let the packet go through. This still is not an optimal solution, however, because it is difficult for a firewall with an open UDP port to efficiently and accurately inspect the packets. Further, it is impossible to do this inspection other than heuristically if those packets are secure.

BRIEF SUMMARY OF THE INVENTION

Systems and methods in accordance with various embodiments of the present invention allow protocols of various levels to pass through a firewall, such as by correlating the protocol with a session already established for a higher-level protocol or by service needs. This can allow, for example, RTP streams including TCP or UDP packets that typically are not allowed by a firewall to be permitted through the firewall by correlating the communications with higher level sessions such as SIP sessions. This can be useful to allow streaming media such as VoIP data to pass through the firewall without weakening firewall policies.

In one embodiment, a session is established for communication between a first participant and a second participant, where a communication path for the session passes through a firewall providing security for the second participant. The session information, such as the addresses for the first and second participants, the firewall port for the session, and a session identifier, can be stored to a firewall-accessible location. When a packet of information is subsequently received by the firewall, the firewall can compare the packet to the session information to see if the packet matches the session information, such as whether the addresses and port match, and whether the session is still an active session. The firewall also can apply any appropriate security policy to the packet using the packet information and/or session information. If the packet matches or agrees with the session information and passes any security policies, the packet can be allowed through the firewall to the second participant. Else, the packet is blocked and does not reach the second participant.

In one embodiment, a service establishes a communication channel or path in order to exchange data between a first participant and a second participant, where a data path for the communication passes through a firewall providing security for the second participant. The communication information, such as the addresses for the first and second participants, the firewall port for the session, and a service identifier, can be stored to a firewall-accessible location, either behind or outside the firewall. When a packet of information is subsequently received by the firewall, the firewall can compare the packet to the service information to see if the packet matches the service information, such as whether the addresses and port match, and whether the service still has an open communication or data exchange path. If the packet agrees with the service information and passes any security policies, the packet can be allowed through the firewall to the second participant. Policies can be set to determine how long a communication channel is permitted for a service, such as by setting an expiration time, and/or the service can be configured to close the communication path (indicate that the path is no longer needed) when the service is done, terminated, or timed out, for example.

In one embodiment where SIP is used, a proxy receives an initial request from the first participant and forwards the request to the second participant. If the second participant responds, the proxy forwards the response to the first participant and establishes a session for the communication between the participants. The proxy can store the information to a firewall-accessible location. When a subsequent packet then is received by the firewall, the firewall then can compare the packet to the session information to determine whether to allow the packet to pass through the firewall to the second location. In one example, the proxy is an SIP proxy operable to establish an SIP session for the participants in response to an SIP message. Data such as RTP data then can be passed through the firewall during the SIP session. For embodiments without SIP, a proxy may not be needed.

Other embodiments will be obvious to one of ordinary skill in the art in light of the description and figures contained herein.

BRIEF DESCRIPTION OF THE DRAWINGS

Various embodiments in accordance with the present invention will be described with reference to the drawings, in which.

DETAILED DESCRIPTION OF THE INVENTION

Figure 1:
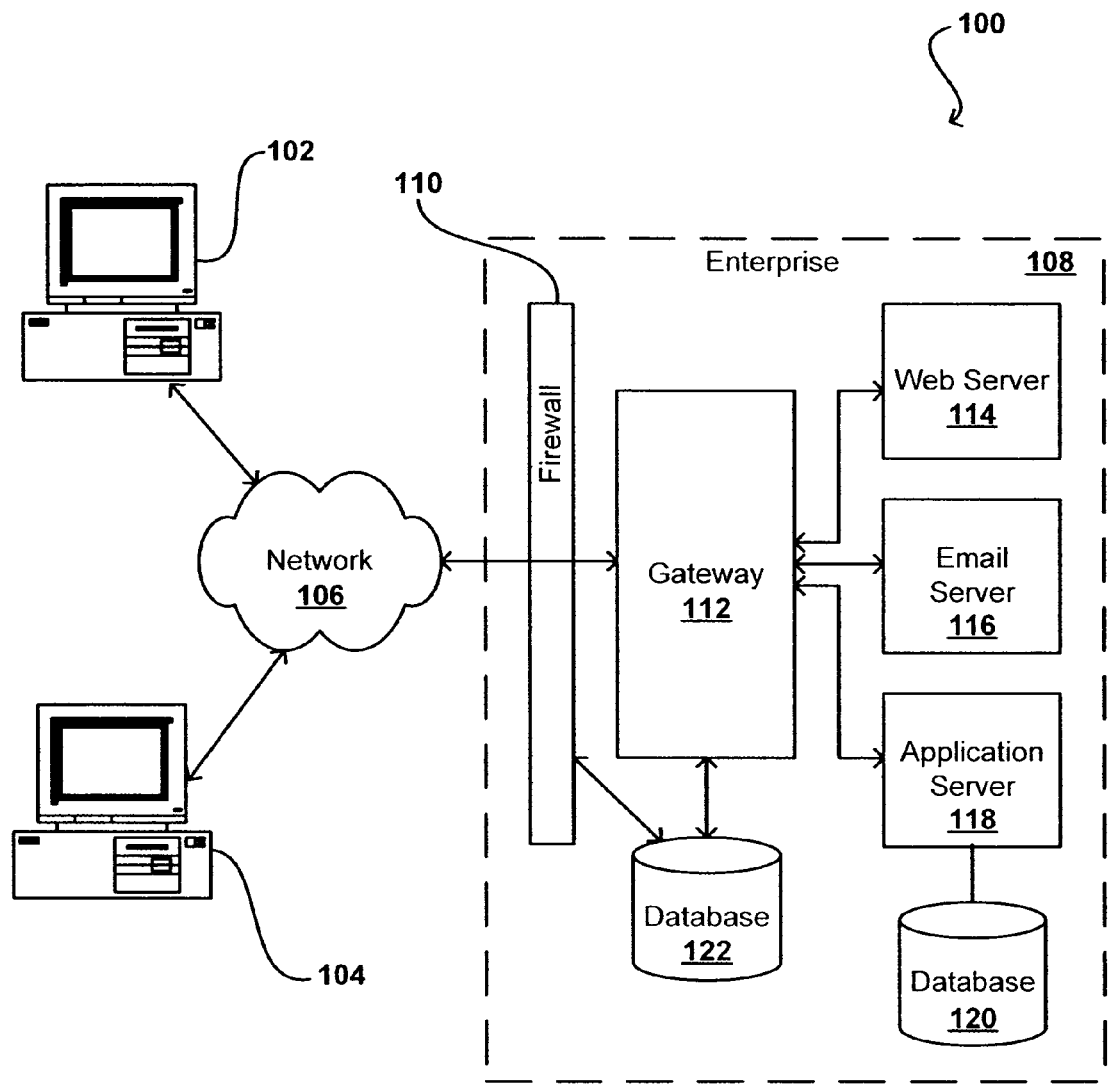
FIG. 1 illustrates a first communication system that can be used in accordance with one embodiment of the present invention.

Systems and methods in accordance with embodiments of the present invention can overcome the afore-mentioned and other deficiencies in existing firewalls systems by changing the way in which certain protocols are passed through a firewall. Such approaches can maintain the integrity of a firewall wall garden environment while allowing for the exchange of any data, including VoIP or other RTP-based information. Instead of opening pinholes in a firewall, information about a established between two parties, including a negotiated port to be used in the path of network traffic between those two parties, is provided or otherwise made available to the firewall. The firewall then can be informed by the party "behind" the firewall of traffic that will take place between addresses for the two parties on that port. When a service or application is involved (as an end point or as a third party, for example), the service or application can log the information for the firewall as described elsewhere herein. Further, using the view of the application log, the logging party can be outside the firewall. In such a case, the first device or an application outside the firewall may log a session. If authorized to do so, such as by policy enforcement on such requests, the firewall may then let this traffic through.

When traffic arrives on that port from one of the specified addresses, the traffic is allowed to pass because the path is established for that communication, coming from that address, on that port. This traffic can include any appropriate packets from that address in the session, including packets for an RTP stream. Upon termination of the communication, any packets arriving at that port, whether from an address of one of the parties or from any other address, are rejected by the firewall. Such an approach allows lower layer traffic, typically not allowed by a firewall, to pass through the firewall by correlating the traffic with higher level sessions established, service-level data exchanged, or messages exchanged, at higher level layer, from inside or outside the firewall. For example, an RTP stream can be passed through the firewall for an established Session Initialization Protocol (SIP) session as discussed below.

Such an approach also differs from traditional methods in that it is not necessary to inspect each packet passing through the firewall for a given session. For example, the firewall may simply check the source and destination addresses for each packet (or the first packets, etc.), and verify that a session exists for those addresses on that port. The firewall may also check the packet content randomly, or at the beginning and then randomly. It should be understood, however, that it is not necessary that the addresses correspond to a session, but could also correspond to the setup of an application or session, or any other authorization or procedure wherein addresses are specified for a given port to exchange information over a given period of time. The addresses, port, and activity are simply provided to the firewall, which can correlate the session, authorization, or procedure with traffic received on that port from a specified address and allow any such information to pass during the lifetime of the session, authorization, or procedure.

A system 100 for sending communications between parties in accordance with one embodiment is shown in FIG. 1. In this system 100, a first participant device 102 is able to connect to a network 106. In this example the user device is a personal computer, but it should be understood that the user device can be any appropriate device capable of connecting with a network and sending and/or receiving communications, including devices such as cellular phones, personal data assistants (PDAs), portable computers, handheld computers, computer terminals, video game systems, wireless devices, and any other such device. Accordingly, the network 106 can include any appropriate network operable to support such devices, including networks such as internets, intranets, extranets, wireless networks, cellular networks, satellite networks, data networks, and any other appropriate network, system, or service. In certain cases, such as for cell phones having Internet or e-mail capability, the network 106 can actually include a combination of networks, such as a cellular network and an Internet-based network, allowing the cell phone to transfer data to and from an Internet-based source, for example. Many other devices, networks, and combinations would be apparent to one of ordinary skill in the art in light of the teachings and suggestions contained herein.

The first participant device 102 in this example is attempting to communicate with a second participant, in this case an enterprise system 108. The enterprise system 108 can provide, host, and/or allowing access to at least one service or application for the first participant device 102, and can connect to the network 106 to communicate with the user device 102 and any appropriate third party device 104 in contact with the network. In this example, the enterprise system 108 includes a firewall 110 configured to allow communications from the first participant device 102 and/or the third party device 104 based on a security policy for the enterprise system 108. A gateway 112 is located behind the firewall 110, as known in the art, which provides access to authorized users, applications, and/or devices to a variety of backend systems. It should be understood that a gateway is included in this example, but is not necessary in all such systems. In this embodiment the gateway 112 provides access to a Web server 114, an email server 116, and an application server 118, any of which can have access to at least one database 120 for storing relevant data. Each of the Web server 114, email server 116, and application server 118 can establish a communication session with the first participant device 102 or the third party device 104, and can send or receive requests, messages, data streams, packets of information, or other such communications. The session can be established at a lower protocol layer than where a packet is received at the firewall, such as a lower OSI layer as known in the art.

When a session, application dialog, or exchange is established between the participant device 102 and one of the components of the enterprise, in this example the Web server 114, the information for the session is written by the gateway or the firewall to a session data table, which can be stored in memory or an enterprise database 122, for example. In embodiments without a gateway, the session information can be written to the session data table by the participant on the secure side of the firewall, here the Web server 114. The stored session information can include information such as the appropriate address of the participant device 102 and Web server 114 for the communications, the port of the firewall 110 through which the communications will occur (the communications path), and a session identifier. The session information also can include other appropriate session information such as an active status of the session, a lifetime, etc.

Once the session information is stored in the session data table, any packet arriving at the firewall can be checked against the session data table to determine whether the packet should be allowed through the firewall. This authorization can be in addition to any other determination as known in the art for authorizing communications to pass through a firewall. For example, a packet arriving at the firewall from the authorized address of the participant device 102 to the authorized port for an active session will be checked against the session information in the session data table, whereby the firewall will find the relevant session information and allow the packet to pass through the firewall to the authorized address of the Web server 114. A packet arriving from the third party device 104 on that port will not be allowed through the firewall (unless the packet has some other authorization), as when the firewall checks the session data store the firewall will not find an appropriate authorization, such that the third party packet will be denied. Deciding which packets to let through based on types of active sessions, user identity, data types, or any other appropriate information can be based on information in the security policy, which can be stored in the enterprise database 122, for example, and made available to the firewall 110 and/or gateway 112.

In one embodiment, a third party call control session is established between the participant device 102 and the third party device 104 as a result of the interaction with the application or application server. Once the session is established, traffic coming from either the participant device 102 or the third party device 104 is allowed through the firewall 110. Either device can cause the application server 118 to establish a third party call control and open the firewall to traffic from either device, as well as from other parties.

Allowing the firewall to access the session information and security policy allows the firewall to act as a security policy enforcer for the enterprise. This can be advantageous for protocols such as the Session Initialization Protocol (SIP), which is a standard for initiating, modifying, and terminating an interactive session that involves multimedia elements such as video, voice, and instant messaging. In typical use, SIP sessions are streams of RTP packets, with RTP being the carrier for the actual voice or video content. The presence of a policy enforcing firewall allows the enterprise to deploy SIP systems, whereby the firewall 110 can process SIP messages and associated RTP streams. The enforcement of the security policies can be achieved by allowing the firewall to evaluate the conditions and execute the actions of the policies, as policies can include any logical combination of conditions and actions, for policies such as authentication and authorization, to be applied to any communication within the SIP network as well as the associated data (RTP) stream. In some embodiments, the firewall can delegate at least some of these tasks to other entities, such as enablers, services, or entities.

The firewall 110 in this example intercepts all communications to or from the enterprise. Therefore, whenever an SIP exchange takes place, the exchange is processed by the firewall before reaching its destination, such as an endpoint or proxy. The firewall identifies the source and the target of the received communication, as well as the nature of the exchange, determines the applicable policies, then enforces those policies. The policies are associated with a session when that session is active. The RTP streams are also associated to the session that is initiated and controlled via SIP. The RTP streams and any related data exchanges are logically intercepted by the firewall, and based on the source, target, port, and session, policies are loaded and enforced on the streamed data. In this way, IP messages entering or exiting the SIP domain and exchanged over TCP/IP can be processed with a SIP bound policy enforcer, here the firewall. Policies then can be used to determine whether an SIP request is authorized. If no additional policies are needed versus the control achieved by the firewall, the policies can be set to zero (i.e. pass through).

Following establishment of a session, with session information written to the session data table as session policies, data can be streamed as RTP streams. Information about the session and the state of the session can be retrieved by the firewall as needed to identify authorized RTP streams on UDP. The firewall captures the UDP stream, and based on the source, target, port, and session information, correlates the RTP session with the session established in SIP. If the RTP/UDP stream is correlated and authorized by the session policies (i.e. resulting from the state of the session), the UDP is passed through the firewall, such as by using a secure connection. Otherwise, the UDP can be blocked or otherwise denied. Any other traffic also is processed by the firewall, thus maintaining the same level of firewall security.

Figure 2:
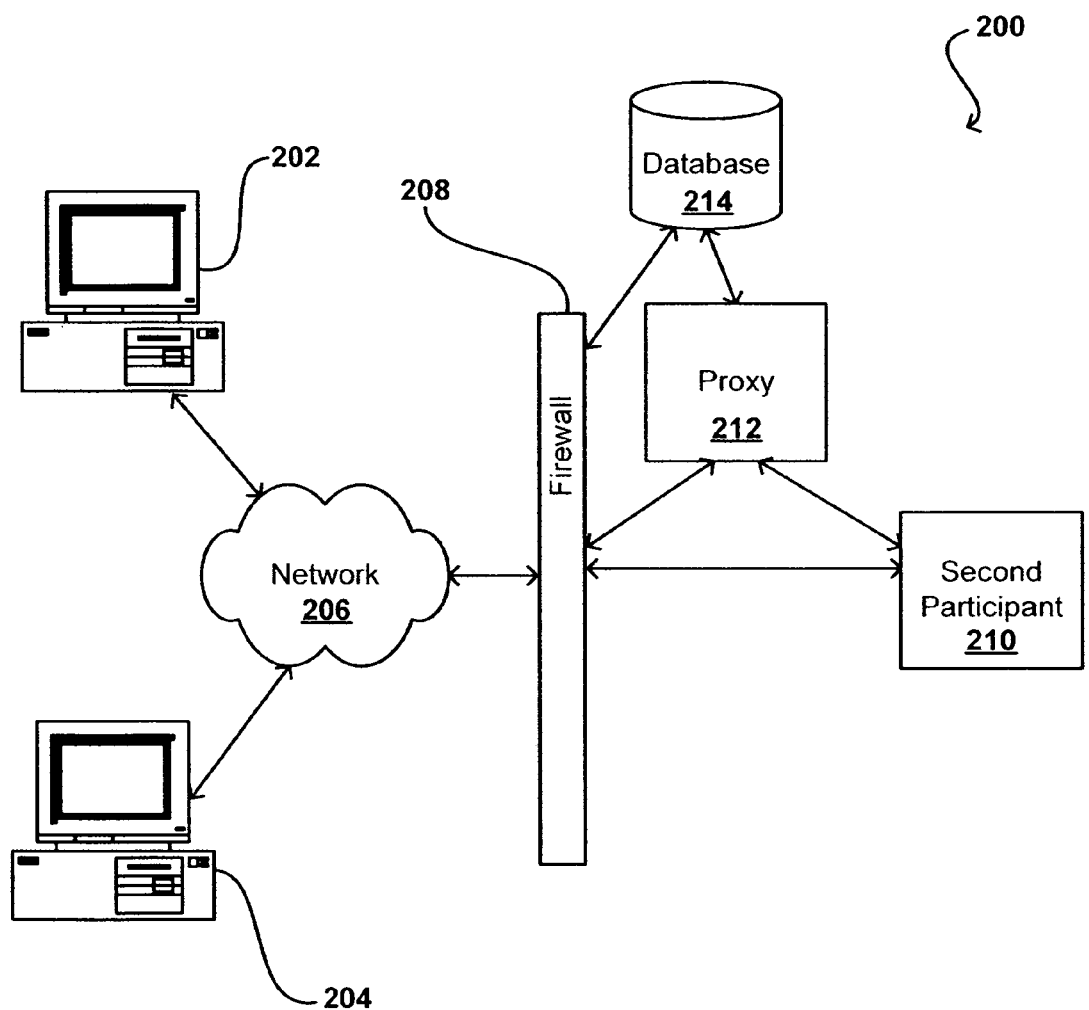
FIG. 2 illustrates a second communication system that can be used in accordance with one embodiment of the present invention.

FIG. 2 illustrates a system 200 in accordance with another embodiment, which utilizes a SIP proxy 212 for SIP communications. It should be understood that SIP is merely an example case, and that there are many other cases where communications can occur without use of SIP and/or a proxy, both as described and suggested herein and as would be apparent to one of ordinary skill in the art in light of the discussion contained herein When the first party device 202 initiates a call to a second participant device 210, for example, an SIP request is sent over the network 206 and passes through the firewall 208, if passing standard security policies, to an SIP proxy 212. The request typically includes the address of the caller, here the first participant device (i.e., in a From header field), and the address of the intended callee, here the second participant device 210 (i.e., in a To header field). The SIP proxy 212 then can forward the request to the second participant device. If the second participant device responds to the proxy server, the proxy can forward the response to the first participant device, forward the acknowledgement of both parties, then establish a session for a point-to-point call between the first and second participant devices and determine the path to use for the session. RTP then is used, in this example, for the communication between the parties on the session.

Once the SIP proxy 212 establishes the session, the information for the session can be written to a session data table in memory or in an appropriate database 214 as discussed above. In some embodiments, establishing a session will cause the appropriate policy or policies to be read into memory accessible to the firewall 208, such that when a packet is received from the first recipient device 202 or a third party device 204 the firewall can analyze the packet using the session information and the appropriate policy, as discussed above, in order to determine whether the packet should pass to the intended destination through the assigned port for the specified session.

A media server or conferencing application also can be used to support conferencing between the participants, such as for the case of a third party call control as discussed elsewhere herein. Such call controls also can be used with seamless switching, such as is described in U.S. patent application Ser. No. 10/856,560, filed May 28, 2004, which is hereby incorporated herein by reference. One thing of importance in this example is that, traffic from a third party device 204 may also be able to cross the firewall. In another example, the first party device 202 may be used to set a session between the second participant 210 and the third party 204 while not itself joining the session.

Because SIP and RTP or other streamed data must be exchangeable between end-points and/or interact with intermediaries, SIP, Secure SIP, RTP, secure RTP, and related schema can ensure that fields are secure while still being accessible to the proper end-point or intermediary. Further, SIP is only one example and many other such proxies and protocols can be used as would be apparent to one of ordinary skill in the art.

Figure 3:
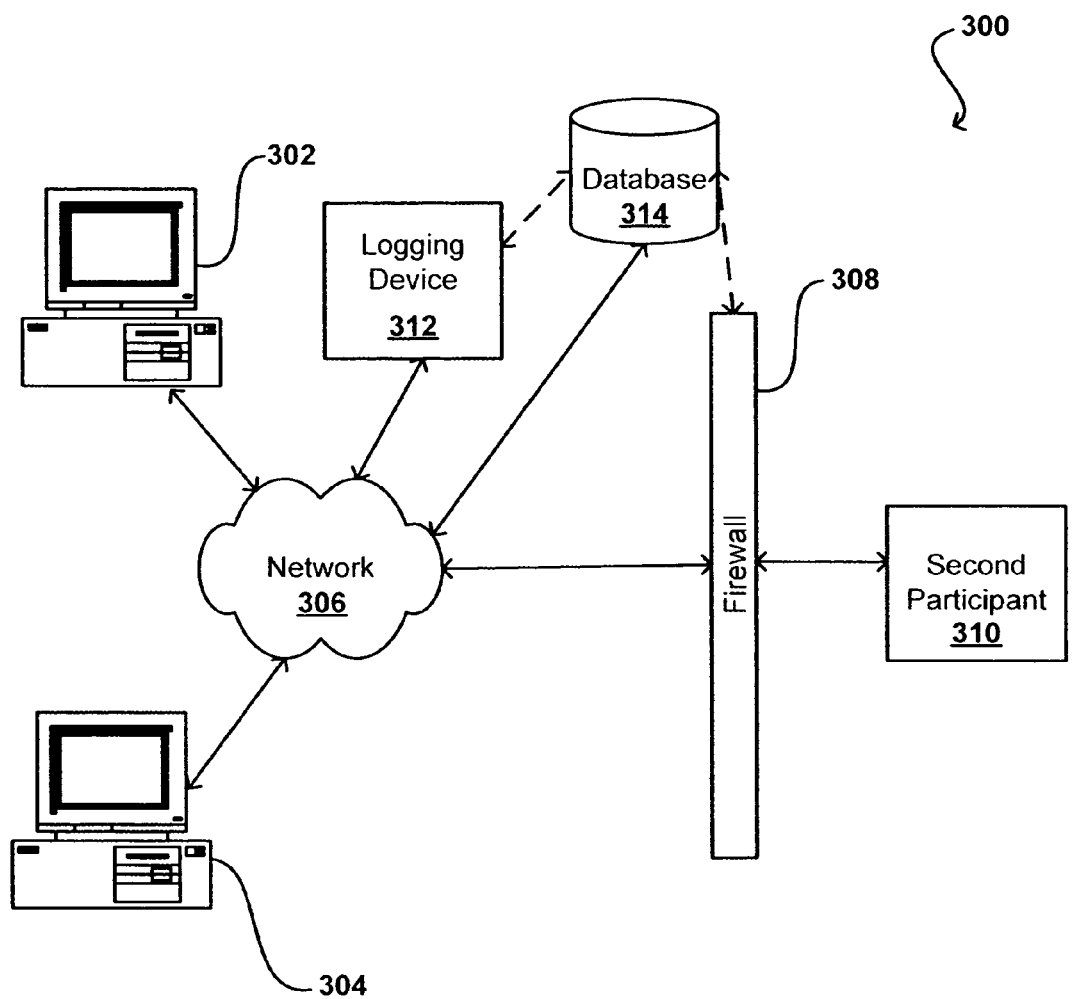
FIG. 3 illustrates a third communication system that can be used in accordance with one embodiment of the present invention.

FIG. 3 illustrates a system 300 in accordance with another embodiment, which utilizes a logging device 312 that in this case is outside the firewall 308, although the logging device could also be inside the firewall as would be apparent to one of ordinary skill in the art. When the one of the first party device 302 and the second participant device 310 initiates a session with the other device, the information can be transmitted (from either device participating in the session or an application for the session) to the logging device 312, which can store information for the session in a firewall-accessible data storage device 314. When the firewall 308 receives a communication for the session from either device, or a third party device 304, the firewall can check the information in the data storage device 314 to determine whether the session is active and to determine whether to allow the communication to pass. In some embodiments, establishing a session will cause the appropriate policy or policies to be read into the data storage device, such that when a packet is received from the first participant device 302 or a third party device 304, for example, the firewall 308 can analyze the packet using the session information and the appropriate policy, as discussed above, in order to determine whether the packet should pass to the second participant 310. This particular example does not utilize SIP or a proxy, and instead utilizes a simple data exchange approach.

Figure 4:
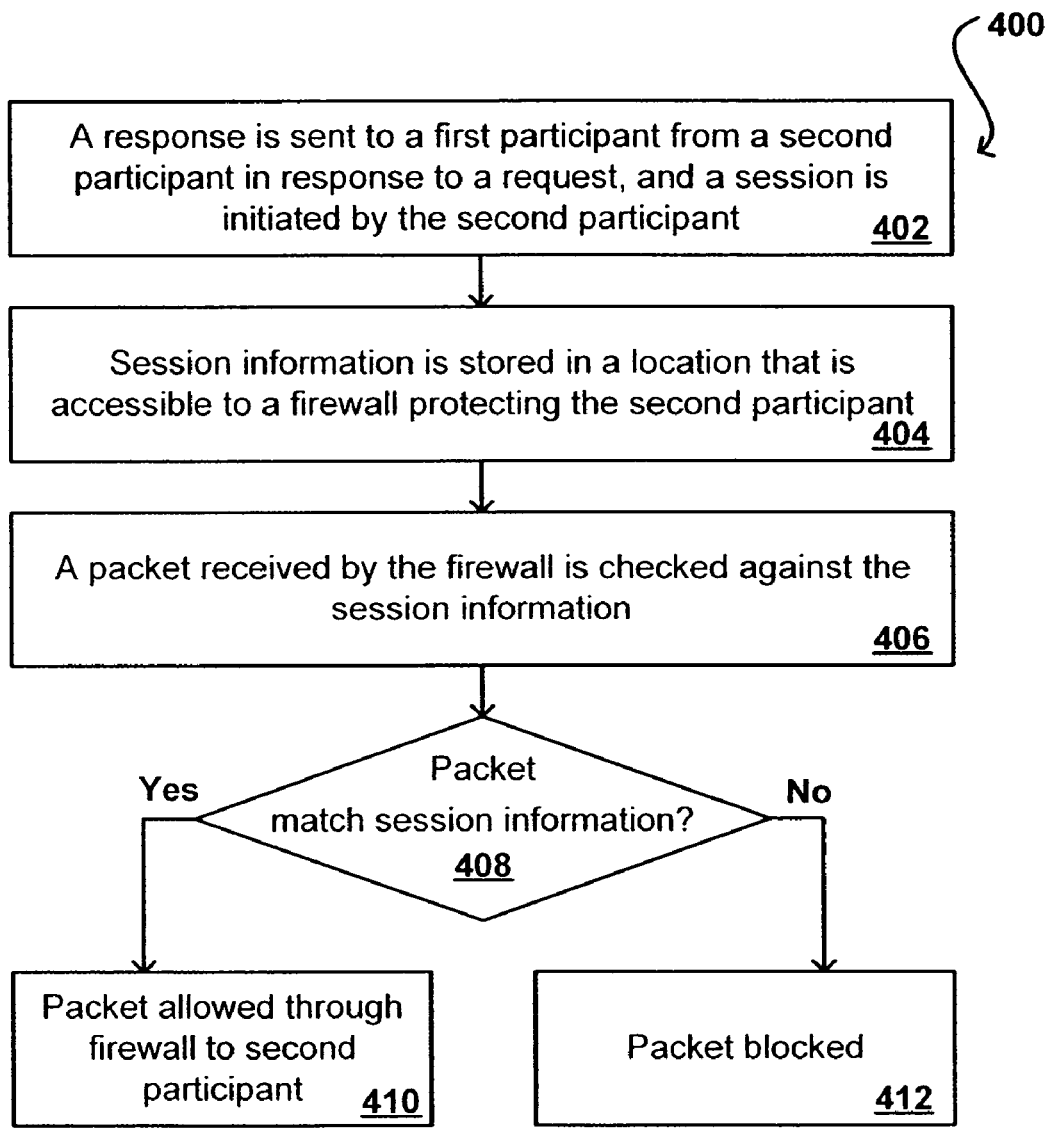
FIG. 4 illustrates steps of a first communication method that can be used in accordance with one embodiment of the present invention.

FIG. 4 illustrates steps of a first method 400 for authorizing packets through a firewall in accordance with one embodiment of the present invention. In this method, a request is received from a first participant device to a second participant device, whereby the second participant device replies to the first participant device and initiates a session for the participant devices 402. The second participant device, or a component in communication therewith, stores the session information in a location that is accessible to the firewall protecting the second participant device 404. As discussed above, the session information can include information such as addresses of the participant devices, the session port, and a session identifier. When a packet is received by the firewall, the firewall can check the packet against the session information 406. If the packet matches session information for an active, authorized session 408, the packet is allowed through the firewall to the second participant device 410. If the packet does not match session information for an active, authorized session, the packet is denied access through the firewall 412. It should be understood that a similar method can be utilized when an application is involved in establishing the session as discussed elsewhere herein.

Figure 5:
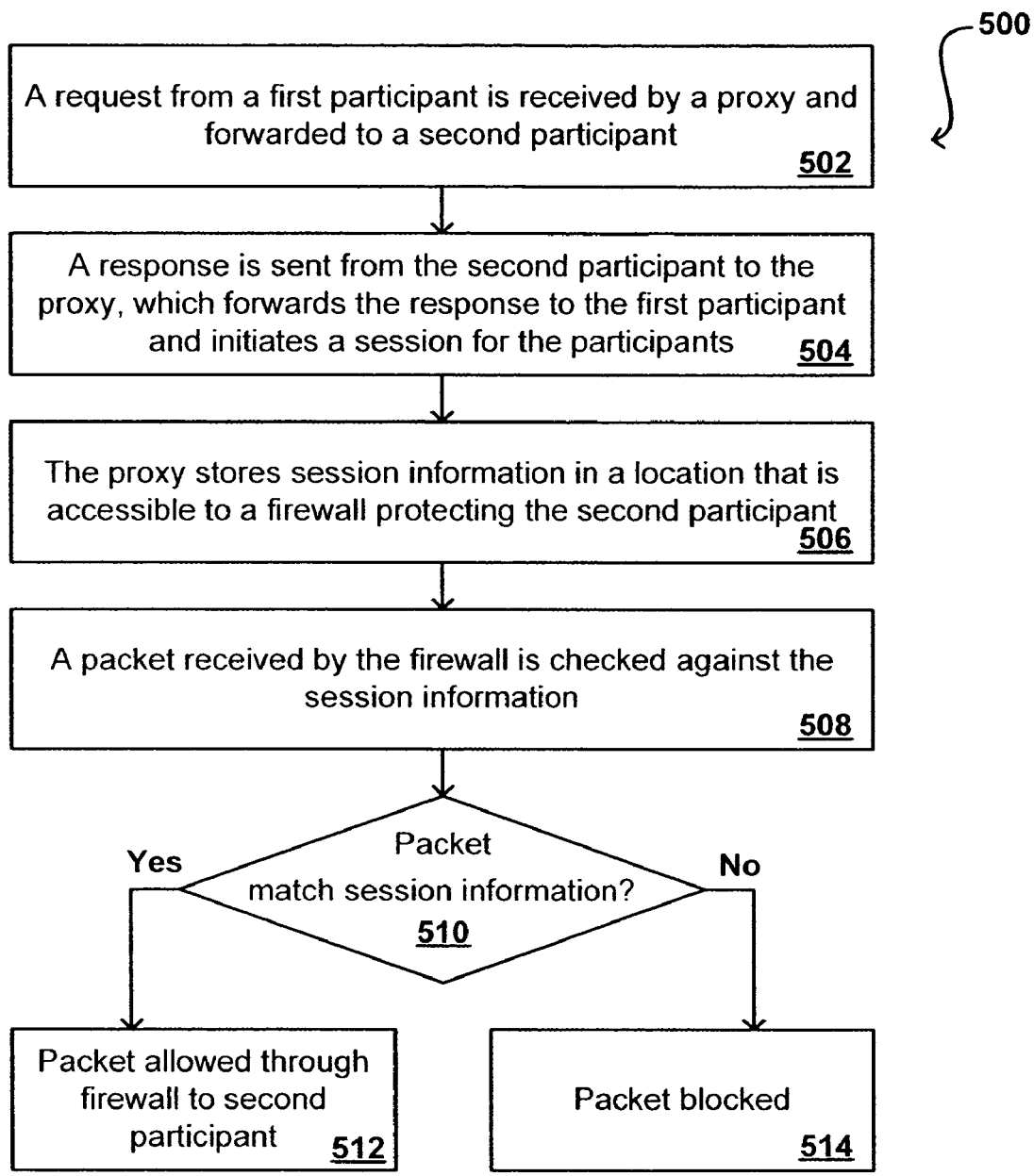
FIG. 5 illustrates steps of a second communication system that can be used in accordance with one embodiment of the present invention.

FIG. 5 illustrates steps of a second method 500 for authorizing packets through a firewall in accordance with an embodiment of the present invention utilizing SIP. In this method, a request is received from a first participant device to a proxy, which forwards the request to a second participant device 502. The second participant device replies to the proxy device, which forwards the message to the first participant device and establishes a session for the participant devices 504. The proxy device stores the session information in a location that is accessible to the firewall protecting the second participant device 506. When a packet is received by the firewall, the firewall can check the packet against the session information 508. If the packet matches session information for an active, authorized session 510, the packet is allowed through the firewall to the second participant device 512. If the packet does not match session information for an active, authorized session, the packet is denied access through the firewall 514. As discussed above, the session information can be stored behind or outside the firewall.

Figure 6:
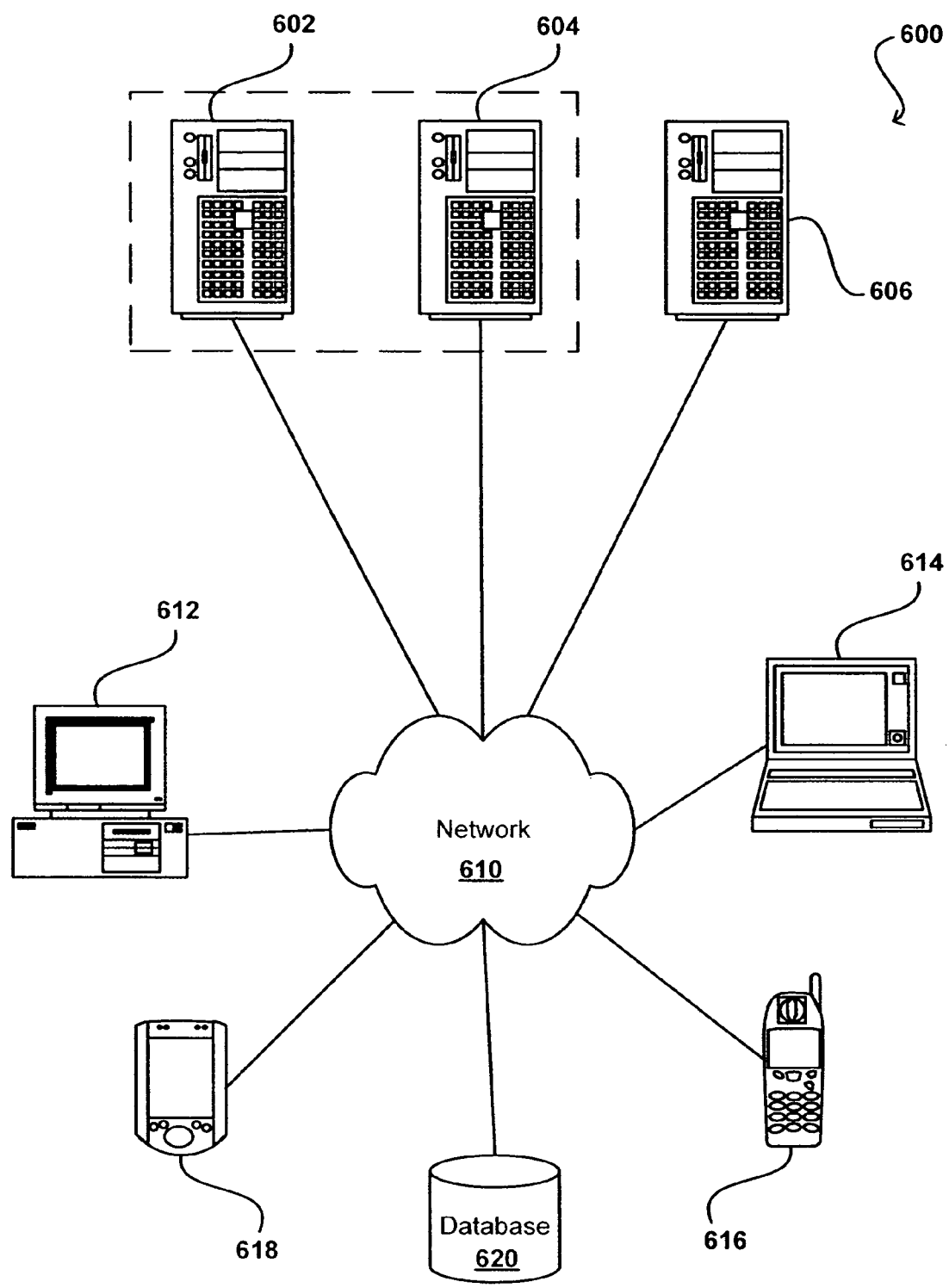
FIG. 6 illustrates components of a computer network that can be used in accordance with one embodiment of the present invention.

FIG. 6 is a block diagram illustrating components of an exemplary operating environment in which various embodiments of the present invention may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running various versions of Microsoft Windows and/or Apple Macintosh operating systems), cell phones or PDAs (running software such as Microsoft Corp.'s Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the exemplary system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10g, that is adapted to store, update, and retrieve data in response to SQL-formatted commands.

Figure 7:
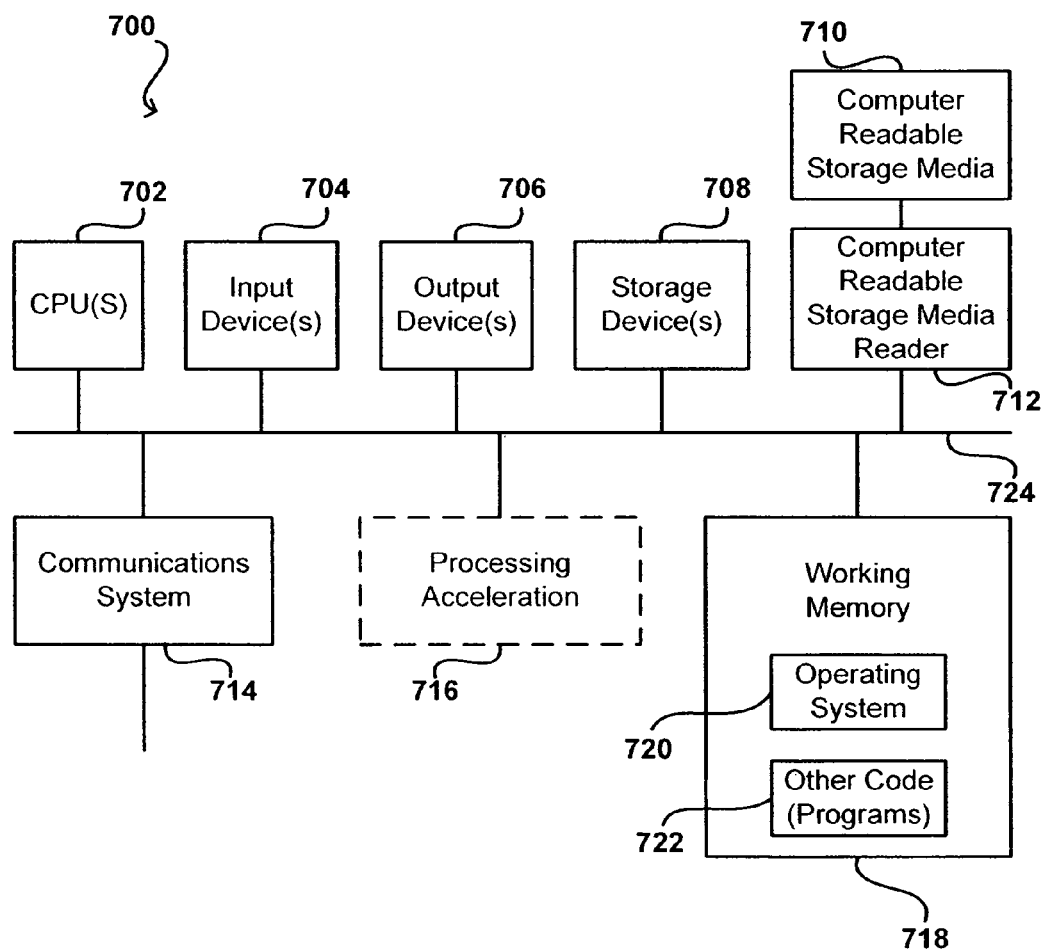
FIG. 7 illustrates components of a computerized device that can be used in accordance with one embodiment of the present invention.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of permitting data packets through a firewall, comprising:
   establishing at the firewall communication at a first level protocol between a first participant and a second participant, a communication path for the communication passing through a firewall;
   storing by the firewall and at a location accessible by the firewall information identifying the communication established at the first protocol level;
   receiving a packet of information at the firewall on a second level protocol, wherein the first level protocol is different from the second level protocol;
   comparing by the firewall the packet of information received on the second level protocol to the stored information identifying the communication established at the first level protocol; and allowing by the firewall the packet to pass through the firewall to the second participant when the packet agrees with the information.

2. A method according to claim 1, wherein:
establishing communication includes one of establishing a session or establishing a service connection for data exchange.

3. A method according to claim 1, further comprising:
blocking the packet where the packet does not match the information identifying the communication established at the first protocol level.

4. A method according to claim 1, wherein:
the information identifying the communication established at the first protocol level includes a first address for the first participant, a second address for the second participant, and a port number of the firewall.

5. A method according to claim 1, wherein:
the information identifying the communication established at the first protocol level includes one of a session identifier or an application identifier.

6. A method according to claim 1, further comprising:
logging by the firewall information about the established communication.

7. A method according to claim 6, further comprising:
enforcing by the firewall at least one policy to authorize the logging.

8. A method according to claim 1, further comprising:
applying by the firewall at least one security policy to the packet where the packet matches the information identifying the communication established at the first protocol level before allowing the packet to pass through the firewall to the second participant.

9. A method according to claim 1, wherein:
the second level protocol is lower than the first level protocol.

10. A method according to claim 1, wherein:
the first level protocol is a Session Initialization Protocol (SIP) layer and the second level protocol is a Real-time Transport Protocol (RTP) layer.

11. A method according to claim 1, wherein:
the first level protocol is one of an application or a service layer.

12. A method according to claim 1, wherein:
the packet contains Voice over IP (VoIP) information.

13. A method according to claim 1, further comprising:
receiving a request from the first participant to a proxy;
forwarding the request from the proxy to the second participant;
receiving a response from the second participant to the proxy; and
forwarding the response to the first participant,
wherein the proxy establishes the session for communication between the first participant and the second participant and wherein the proxy is located outside of the firewall.

14. A method according to claim 1, wherein:
the firewall-accessible location is outside the firewall.

15. A method according to claim 1, wherein:
comparing by the firewall the packet of information to the information identifying the communication established at the first protocol level is done for random received packets and not all received packets.

16. A system for permitting data packets through a firewall, comprising:
a communication component operable to receive a request from a first participant and forward the request to a second participant, the communication component further operable to receive a response from the second participant and forward the response to the first participant, the communication component further operable to establish a communication for the first and second participant devices at a first level protocol and store information identifying the communication established at the first level protocol in response thereto; and
a firewall operable to receive a packet of information on a second level protocol and compare the packet to the information identifying the communication established at the first protocol level, wherein the first level protocol is different from the second level protocol, the firewall being further operable to allow the packet to pass through the firewall to the second participant where the packet agrees with the information identifying the communication established at the first protocol level and to block the packet where the packet does not agree with the information identifying the communication established at the first protocol level.

17. A system according to claim 16, wherein:
the communication component is one of a proxy, a service, or an application.

18. A system according to claim 16, wherein:
the information identifying the communication established at the first protocol level includes a first address for the first participant, a second address for the second participant, and a port number of the firewall for the session.

19. A system according to claim 16, wherein:
the information identifying the communication established at the first protocol level includes one of a session identifier or an application identifier.

20. A system according to claim 16, wherein:
the firewall is further operable to apply at least one security policy to the packet where the packet agrees with the information identifying the communication established at the first protocol level before allowing the packet to pass through the firewall to the second participant.

21. A system according to claim 20, wherein:
the first level protocol is a Session Initialization Protocol (SIP) layer and the second level protocol is a Real-time Transport Protocol (RTP) layer.

22. A system according to claim 20, wherein:
the first level protocol is one of an application or a service layer.

23. A computer readable memory having stored thereon a series of instructions which, when executed by a processor, cause the processor to permit data packets to pass through a firewall by:
establishing at the firewall a communication at a first level protocol between a first participant and a second participant, a communication path for the established communication passing through a firewall;
storing by the firewall and at a location accessible by the firewall information identifying the communication established at the first protocol level;
receiving a packet of information at the firewall on a second level protocol, wherein the first level protocol is different from the second level protocol;
comparing by the firewall the packet of information received on the second level protocol to the stored session information identifying the communication established at the first level protocol; and
allowing by the firewall the packet to pass through the firewall to the second participant where the packet agrees with the stored session information for the established communication.

24. A computer readable memory according to claim 23, further comprising:
applying by the firewall at least one security policy to the packet where the packet agrees with the information identifying the communication established at the first protocol level before allowing the packet to pass through the firewall to the second participant.

* * * * *

UNITED STATES PATENT AND TRADEMARK OFFICE
CERTIFICATE OF CORRECTION

PATENT NO.         : 8,234,702 B2
APPLICATION NO.    : 11/512585
DATED              : July 31, 2012
INVENTOR(S)        : Maes It is certified that error appears in the above-identified patent and that said Letters Patent is hereby corrected as shown below:

In column 1, line 60, delete "higher-level" and insert -- higher level --, therefor.

In column 9, line 25, delete "commercially available" and insert -- commercially-available --, therefor.

Signed and Sealed this
Twenty-third Day of October, 2012

David J. Kappos
*Director of the United States Patent and Trademark Office*